Sept. 16, 1952  H. W. COLLINS ET AL  2,610,893
GAS AND LIQUID CONTACT PAD
Filed Jan. 11, 1949

INVENTORS
Thomas Evans Philipps
& Howard W. Collins
BY
*Starline Overman*
ATTORNEYS

UNITED STATES PATENT OFFICE 2,610,893

GAS AND LIQUID CONTACT PAD

Howard W. Collins, Newark, and Thomas E. Philipps, Granville, Ohio, assignors to Owens-Corning Fiberglas Corporation, Toledo, Ohio, a corporation of Delaware Application January 11, 1949, Serial No. 70,246

11 Claims. (Cl. 299—20)

This invention relates generally to apparatus embodying means employed to bring gas and liquid into intimate contact. More particularly the invention concerns itself with apparatus for cooling air by passing the same through a porous body containing moisture.

One common process used extensively in the past for the purpose of cooling air by evaporation is to filter or pass the air through water-saturated wood chips. The moisture on the wood chips is evaporated by heat extracted from the air and the latter is thereby cooled. One serious disadvantage of the above process is that wood being an organic material, it will decompose, and it aids the growth of algae and fungi which produce an objectionable sour odor. Thus frequent replacement is required in order to obtain reasonably satisfactory results.

One of the objects of this invention is to provide a self-sustaining gas and liquid contact mat or pad sufficiently porous to enable relatively free flow of air therethrough, capable of being readily wetted by water, one not subject to decay, and that does not promote odor-producing growths. The body or pack comprises a mat of glass or other inorganic fibers secured together by a binder. The mat of glass or other inorganic fibers is at a relatively low density to have a low resistance to air flow, and when uniformly wetted, it promotes evaporation at a very high rate. In addition, making the mat of smooth, non-porous glass fibers renders it possible to readily remove any dust or foreign matter that may accumulate on the fibers by washing the body or pad.

Another object of this invention is to provide a filter or pack comprising a self-sustaining mat consisting of layers of glass or similar inorganic strands or yarns of substantially continuous length laid down in the form of loops or coils, and arranged with the coils or loops of one layer overlapping one another as well as the coils or loops of adjacent layers. The coils or loops are substantially uniformly distributed, and are secured together by a resinous binder dispersed throughout the mat. This general form of mat is preferred, because it affords substantial strength in practically all directions parallel to the plane of the mat, and also lends itself more readily to obtaining the requisite strength in a mat having the lightness and low density required for the free passage of air therethrough. Moreover the loop or coil arrangement of the fibers prevents channeling of any water deposited on the pad or mat and serves to more uniformly distribute the moisture throughout the area of the mat.

Another object of this invention is to secure the fibers together in mat or pack form by a binder which is water insoluble and which has the stiffness required to hold the fibers or yarns in a sufficiently loose condition to provide the mat with the low density and high porosity required to permit relatively free passage of air therethrough.

A further object of this invention is to secure the glass or inorganic fibers in mat form with a binding agent that is insoluble in water to retain sufficient strength in the presence of the water applied to the pad to maintain the strength of the pad or mat but that will at the same time be readily wetted by the water. To accomplish this, the binder contains a thermosetting resin, such as melamine formaldehyde, a thermoplastic resin such as polyvinyl acetate and a clay type filler such as bentonite or diatomaceous earth. The thermoset resin contributes a high proportion of strength to the pad. The thermoplastic resin also does much of the binding, and in addition is reasonably well wetted by water. The filler tends to make the binder porous to allow water to pass through the binder and it promotes capillarity at the zones where the yarns or fibers intersect, so that it is possible to obtain substantially uniform wetting of the mat or pad over substantially its entire area. Also the filler in the resinous materials imparts added strength to the mat or pad.

A still further object of this invention is to provide a mat or pack of the above general type which is self-sustaining and may be readily assembled with or removed from the apparatus as a unit. With the present arrangement the pack may be merchandised as a self-contained unit, and may be quickly installed by the domestic user and by unskilled personnel.

The foregoing as well as other objects will be made more apparent as this description proceeds, especially when considered in connection with the accompanying drawing, wherein.

Figure 1:
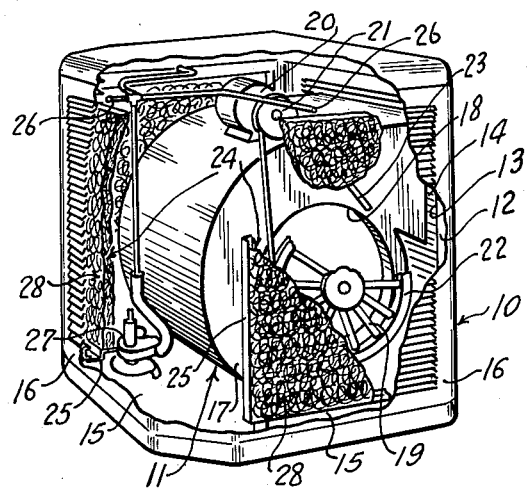
Figure 1 is a perspective view partly in section of apparatus having a pack embodying the present invention.
Figure 2:
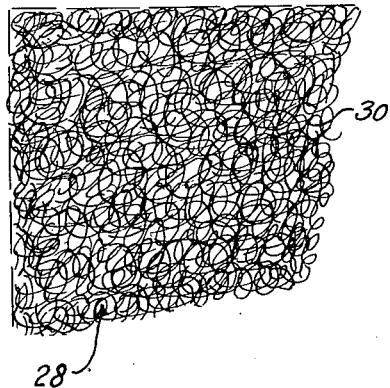
Figure 2 is a fragmentary plan view of the pack.
Figure 3:
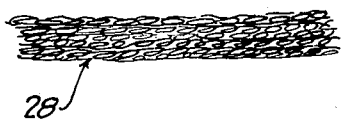
Figure 3 is a side elevational view of the pack shown in Figure 2.

Although the pack forming the subject matter of this invention has many and diversified uses, it is especially designed for use as a contact mat and may be successfully employed in air cooling equipment for bringing air into intimate contact with a liquid such as water. For the purpose of illustrating the present invention an air cooling apparatus is shown comprising a cabinet 10 and a blower 11. The cabinet 10 may be of any desired shape and for the purpose of economy is preferably formed of sheet metal stampings. The front wall 12 of the cabinet has an opening 13 normally closed by a removable panel 14 having louvers through which air may be discharged from the interior of the cabinet. The opposite side and rear walls of the cabinet may also have openings 15 closed by removable panels 16 similar to the panel 14 in that they are also formed with louvers. The purpose of the openings 15 is to permit relatively free flow of air into the cabinet.

The blower 11 is of orthodox design comprising a housing 17 having an opening 18 at the center and a fan 19 of the sirocco type supported in the opening 18 for rotation. The fan is driven by an electric motor 20 secured to the top of the housing and having a pulley 21 on the drive shaft thereof. The pulley 21 is connected to a pulley 22 on the fan shaft by a suitable belt 23, and rotates the fan 19 at the desired speed. The general arrangement is such that rotation of the fan 19 draws air into the cabinet through the openings 15 and also draws air from the interior of the cabinet into the blower housing 17. In accordance with conventional practice the housing 17 has an outlet duct which communicates directly with the opening 13 in the front wall of the cabinet, and the air drawn into the housing 17 is discharged by the fan through the opening 13 in the cabinet.

As air is drawn through the inlet openings 15 into the cabinet, it is brought into intimate contact with water and is cooled by the evaporation process. Briefly the air is drawn through a filter or porous pack 24 which is removably supported on each of the panels 16 at the inner sides of the latter, and are of a size to compel all of the air drawn through the inlet openings 15 to flow through the packs 24. In the present instance the packs are removably held in position by angle frames 25 respectively secured to the inner sides of the closure panels 16. The arrangement is such that the packs are removed from the cabinet as an assembly with the panels and may subsequently be detached from the panels. The packs 24 form a self-contained unit of sufficient rigidity to enable conveniently handling the same during replacement or cleaning.

As will be more fully hereinafter set forth, the packs 24 are formed of a material which is readily wetted by water, and any suitable means may be employed for applying water to the packs 24. As shown in Figure 1 of the drawings, water is sprayed on the packs by spray heads 26 supported within the cabinet 10 adjacent the top edges of the packs and connected to a source of water supply by a pump 27. Due to the nature of the packs 24 substantially the entire area thereof is uniformly wetted by the water and air filtering through the packs is brought into intimate contact with the water.

Each pack 24 comprises a mat 28 composed of a multiplicity of fibers arranged in layers and held together in an integrated unit by a resinous binder. The fibers may be produced from various different materials, but it is preferred to use glass or some similar inorganic material which is readily wettable by water, and which maintains its strength even when immersed in water. Glass is especially suitable for use in the present application, because it not only promotes capillarity along its surface and maintains its strength in the presence of moisture, but in addition, may be produced economically on a production basis and does not support combustion. Also glass does not influence the growth of algae and fungi or other foreign matter which may produce an odor. A further advantage of glass fibers is that they form mats that possess relatively low air flow resistance, and assists materially in obtaining an exceptionally high evaporative efficiency.

Also the fibers may be in the form of strands, rovings, slivers or yarns. In the present instance where low density and high strength are of prime importance, it is preferred to employ yarns of substantially continuous glass fibers. Also in the interests of obtaining maximum strength in a relatively low density mat, the yarns or fibers forming each layer of the mat are arranged in coils or helixes 30 which extend predominantly in one direction with adjacent coils overlapping one another. The coils or fibers in adjacent layers are also arranged in overlapping relationship, and may extend in the same or different directions, depending upon the strength characteristics required. Attention is further called to the fact that the coils or helixes 30 are all substantially the same in size in order to impart uniformity to the mat structure and minimize any tendency for the water to channel as it flows through the mat.

For the present application of the mat the latter must possess a sufficiently low density and high porosity to enable relatively free passage of air therethrough. Although the specific density of the mat depends to some extent on the power available for drawing air through the mat, nevertheless, for most types of apparatus mats having a density of one and one-half to four pounds per cubic foot are suitable. The yarns may also comprise relatively large diameter fibers of approximately .0070 inch in diameter and in any case are coated with a relatively stiff resinous binder which not only secures the fibers or yarns together at the points of intersection of the coils, but in addition, maintain the fibers in the loose state required to obtain the low density and high porosity desired.

A water suspension of the binder ingredients is preferably sprayed or otherwise applied after the yarns are laid down in mat formation on a suitable conveyor, not shown. The particular binder used must not only have good bonding qualities, but must also be water insoluble, and in addition, must be readily wettable by water so as to aid in the passage of the water through the mat. One satisfactory binder comprises generally a thermosetting material such as melamine formaldehyde, a thermoplastic material such as polyvinyl acetate and a clay such as bentonite. These ingredients may be mixed in equal parts, say five per cent of each, based on solids, and about eighty-five per cent water, which is sufficient to enable spraying the binder composition on the mat. These proportions are merely given by way of example, and may be varied depending upon the results desired. The melamine formaldehyde resin enables maintaining the requisite strength of the mat in the presence of water, and the polyvinyl acetate resin does much of the actual bonding. The bentonite filler contributes porosity to the binder to facilitate passage of water through the mat and particularly promotes capillarity at the points of intersections of the fibers. Also bentonite adds strength to the mat and improves the stability of the latter. A binder possessing the above ingredients not only provides a strong, self-sustaining mat of low density and high porosity, but also promotes the flow of water uniformly throughout the mat. If desired, the wetting characteristics of the mat may be increased by employing a wetting agent such as aerosol in the binder.

Although the above type of binder is preferred, nevertheless, the composition may be varied by substituting other fillers, such for example, as diatomaceous earth for bentonite and by using polystyrene resin instead of polyvinyl acetate as the thermoplastic resin. Butadiene styrene and polyvinyl chloride are further examples of thermoplastic resins that may be used in place of polyvinyl acetate. There are other thermosetting resins such as phenol formaldehyde, urea formaldehyde, resorcinol formaldehyde, phenol furfural, furan resins, aniline formaldehyde, polyesters, for example, of the alkyd type such as glycerol-phthalic anhydride resins and glycerol-maleic anhydride resins, and the like, that may be used instead of melamine, but the latter has been found especially advantageous because of its great strength and also because it is odorless. In general, the binder may contain:

|  | Per Cent |
|---|---|
| Thermosetting resin | 10 to 25 |
| Thermoplastic resin | 10 to 25 |
| Clay filler | 10 to 25 |

Mats constructed in accordance with the above possess sufficient stability to enable supporting the same in a vertical position within the cabinet 10 at the inner sides of the air intake openings and have the required porosity to permit relatively free flow of air therethrough. Water from the spray heads 26 is deposited on the upper portions of the mats and is uniformly distributed throughout substantially the entire area of the mats owing to the high wetting characteristics of both the glass fibers and binder used. Also the coiled arrangement of the fibers previously described prevents any tendency for the water to channel through the mat and contributes materially to obtaining a uniform wetting of the entire area of the mat. Thus the air flowing through the mats is brought into intimate contact with the water and is cooled by transferring heat to the water. The mats will perform their intended operation for long periods without attention, and any dust or foreign matter that may eventually accumulate on the mats may readily be removed by washing the mats. Moreover, due to the simplicity of the mats the latter may be economically produced on a production basis, and may be sold to the consumer at prices that make periodic replacement practical.

What we claim as our invention is:

1. A contact mat for fluids comprising a mass of inorganic fibers and a binder dispersed throughout the mat for binding the fibers together, said binder comprising an organic thermosetting binder, an organic thermoplastic binder and a filler of the clay type.

2. A contact mat for fluids comprising a mass of inorganic fibers arranged in overlapping relation to form a porous mat and a binder dispersed throughout the mat for binding the fibers together, said binder comprising melamine formaldehyde, polyvinyl acetate and bentonite.

3. A mat comprising a plurality of continuous strands of glass fibers arranged in swirl patterns in overlapping relation to form a porous mat, and a water insoluble organic binder dispersed throughout the mat for securing the coils together and embodying a hydrophilic filler.

4. A mat comprising a plurality of continuous strands of glass fibers arranged in swirl patterns in overlapping relation to form a porous mat, and a binder material dispersed throughout the mat comprising a composition containing a thermosetting binder, a thermoplastic binder, and a filler selected from the group consisting of clay and diatomaceous earth.

5. A structure comprising a plurality of continuous strands of glass fibers arranged in swirl patterns in overlapping relation to form a porous mat, and a resinous material dispersed throughout the mat comprising melamine formaldehyde, polyvinyl acetate, and bentonite.

6. A contact mat for fluids comprising laminated layers of inorganic fibers, the fibers in each layer being arranged in loop formation with adjacent loops in each layer overlapping and paralleling one another and also the loops in adjacent layers, and a binder to coat and secure the loops one to another comprising a thermosetting resin, a thermoplastic resin, and a water absorbent selected from the class consisting of clay and diatomaceous earth.

7. A contact mat comprising glass fibers bonded one to another by a binder comprising a thermosetting resin, a thermoplastic binder, and a water absorbent selected from the class consisting of clay and diatomaceous earth.

8. In apparatus for bringing gas and liquid into intimate contact, a composite structure comprising endless lengths of glass fibers arranged in swirl patterns in overlapping relation to form a porous mat, and an organic binder containing a porous filler selected from the group consisting of clay and diatomaceous earth dispersed throughout the mat to bind the fibers together into a composite structure.

9. In apparatus for bringing gas and liquid into intimate contact, a plurality of glass fibers of continuous length arranged in swirl patterns in overlapping relation to form a porous mat, and a binder composition dispersed throughout the mat to secure the fibers one to another comprising a thermosetting resinous binder, a thermoplastic resinous binder and a porous siliceous filler.

10. In apparatus for bringing gas and liquid into intimate contact, a plurality of glass fibers of continuous lengths arranged in swirl patterns in overlapping relation to form a porous mat, and a binder dispersed throughout the mat for coating the fibers and securing them together comprising melamine formaldehyde, polyvinyl acetate and diatomaceous earth.

11. A contact mat for fluids comprising a plurality of endless strands of glass fibers arranged in swirl patterns in overlapping relation to form a porous mat, and a binder securing the fibers one to another at their intersections comprising melamine formaldehyde, polyvinyl acetate and bentonite present in substantially equal proportions.

HOWARD W. COLLINS.
THOMAS E. PHILIPPS.

(References on following page)

REFERENCES CITED

The following references are of record in the file of this patent:

UNITED STATES PATENTS

| Number | Name | Date |
|---|---|---|
| Re. 22,402 | Swain et al. | Dec. 7, 1943 |
| 1,881,932 | Powell | Oct. 11, 1932 |
| 2,021,437 | Walsh | Nov. 19, 1935 |
| 2,178,614 | Slayter | Nov. 7, 1939 |
| 2,271,829 | Powers | Feb. 3, 1942 |

FOREIGN PATENTS

| Number | Country | Date |
|---|---|---|
| 613,446 | Great Britain | Nov. 29, 1948 |

OTHER REFERENCES

Fiberglas Standards, Sheet D3.2.1, June 1, 1944, Owens-Corning Fiberglas Corp., Toledo, Ohio.